(12) United States Patent
Fei et al.

(10) Patent No.: US 11,302,099 B2
(45) Date of Patent: Apr. 12, 2022

(54) METHOD AND DEVICE FOR RECOGNIZING STATES OF ELECTRICAL DEVICES

(71) Applicants: Schneider Electric Industries SAS, Rueil Malmaison (FR); Weihe Fei, Shanghai (CN)

(72) Inventors: Weihe Fei, Shanghai (CN); Emmanuel Dreina, Grenoble (FR); Frederic Pillou, Grenoble (FR); Pierre Raulin, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 16/652,102

(22) PCT Filed: Sep. 27, 2018

(86) PCT No.: PCT/CN2018/108037
§ 371 (c)(1),
(2) Date: Mar. 30, 2020

(87) PCT Pub. No.: WO2019/062818
PCT Pub. Date: Apr. 4, 2019

(65) Prior Publication Data
US 2020/0250431 A1  Aug. 6, 2020

(30) Foreign Application Priority Data

Sep. 30, 2017 (CN) .......................... 201710917722.7

(51) Int. Cl.
G06K 9/00 (2022.01)
G06V 20/20 (2022.01)
G06V 10/75 (2022.01)

(52) U.S. Cl.
CPC ............ *G06V 20/20* (2022.01); *G06V 10/751* (2022.01)

(58) Field of Classification Search
CPC .... G05B 19/418; G06K 9/00; G06K 9/00671; G06K 9/6202; G06K 9/32; G06K 9/62;
(Continued)

(56) References Cited

U.S. PATENT DOCUMENTS

2007/0236366 A1* 10/2007 Gur .................... G06K 9/00832
340/945
2014/0368891 A1* 12/2014 Beato ....................... G06K 9/32
358/474
(Continued)

FOREIGN PATENT DOCUMENTS

CN           103324943 A     9/2013
CN           105825204 A     8/2016
(Continued)

OTHER PUBLICATIONS

English Language Machine Translation of Chinese Patent Application Publication No. CN103324943A, published on Sep. 25, 2013, 14 pages.
(Continued)

*Primary Examiner* — Syed Haider
(74) *Attorney, Agent, or Firm* — Locke Lord LLP (57) ABSTRACT

Embodiments of the present disclosure provide a method and device for recognizing a state of an electrical device. The method includes obtaining an image of the electrical device in a field, wherein the electrical device is disposed on a plane of a predefined polygon in the field; obtaining an original appearance image of the electrical device in the field by recovering the predefined polygon in the image to an original appearance of the predefined polygon; and determining the state of the electrical device based on the original appearance image of the electrical device in the field.

16 Claims, 5 Drawing Sheets

(58) Field of Classification Search
CPC ............ G06K 9/3275; G06K 2209/19; G06K 2009/363; G06K 2209/03; G06V 20/20; G06V 10/751

See application file for complete search history.

(56) References Cited

U.S. PATENT DOCUMENTS

| | | | |
|---|---|---|---|
| 2015/0049918 A1 | 2/2015 | Fan et al. | |
| 2016/0140701 A1 | 5/2016 | Angara et al. | |
| 2016/0253560 A1* | 9/2016 | Tokutake | H04N 5/232933 382/103 |
| 2017/0127526 A1* | 5/2017 | Imasu | G05B 19/418 |

FOREIGN PATENT DOCUMENTS

| | | |
|---|---|---|
| CN | 105894015 A | 8/2016 |
| CN | 106355187 A | 1/2017 |
| FR | 2990286 A1 | 11/2013 |
| WO | 2015028978 A1 | 3/2015 |
| WO | WO-2015028978 A1 * | 3/2015 ......... G05B 19/4183 |

OTHER PUBLICATIONS

English Language Machine Translation of Chinese Patent Application Publication No. CN105825204A, published on Aug. 3, 2016, 7 pages.

English Language Machine Translation of Chinese Patent Application Publication No. CN106355187A, published on Jan. 25, 2017, 8 pages.

English Language Machine Translation of Chinese Patent Application Publication No. CN105894015A, published on Aug. 24, 2016, 23 pages.

International (PCT) Search Report for International Patent Application No. PCT/CN2018/108037, dated Jan. 4, 2019, 4 pages.

Extended European Search Report dated Apr. 7, 2021 for corresponding European Patent Application No. 18860822.8, 8 pages.

* cited by examiner

METHOD AND DEVICE FOR RECOGNIZING STATES OF ELECTRICAL DEVICES

FIELD

Embodiments of the present disclosure generally relate to the electrical field, and more specifically, to methods and devices for recognizing states of electrical devices.

BACKGROUND

Digital monitoring of electrical devices is a basic element for achieving digital management and networked management of industrial devices. In order to facilitate control over the state of the device, common electrical devices are designed with components that are convenient for users to observe, for example, on and off of buttons, change in brightness or color of the indicator light, change in orientation of the handle of the circuit breaker, and change of meter hand, or the like. These visual components can be easily recognized by human eyes but it is preferred to remotely detect the state of electrical devices by automation method and intelligently monitor and make decision analysis by means of information digitalization.

At present, there are related solutions that use cameras to automatically identify the state of electrical devices. However, limited to the complex and variability of the field environment and the insufficient automatic recognition performance of the camera, the technology has not stepped into the practical stage yet.

The general camera image recognition method is to first preprocess the image, including color extraction, grayscale conversion, noise reduction processing, contrast enhancement and other processing techniques, and then scan the entire preprocessed image to determine whether there are target graphic features related to states of electrical devices, and determine electrical device states by using known image recognition methods, such as spatial matching algorithms, target edge extraction algorithms, color extraction and matching algorithms to analyze the degree of correspondence between the image and the target characteristics of electrical devices. With this method, there is a large amount of image pre-processing calculations and the pre-processing parameters need to be adjusted based on the actual lighting environment. Limited to large amounts of calculation and inefficiency caused by judgment following scan of the entire image, the method has the shortcoming of instability, poor universality and easy misjudgment due to the influence of the variety of electrical device models, the variability of ambient lighting, and the uncertainty of the camera position.

SUMMARY

Embodiments of the present disclosure are directed to provide a method, an apparatus, and a system that can at least partially solve the above-mentioned problems of the prior art.

In accordance with some embodiments, there is provided a method of recognizing a state of an electrical device. The method comprises obtaining an image of the electrical device in a field, wherein the electrical device is disposed on a plane of a predefined polygon in the field; obtaining an original appearance image of the electrical device in the field by recovering the predefined polygon in the image to an original appearance of the predefined polygon; and determining the state of the electrical device based on the original appearance image of the electrical device in the field.

In some embodiments, the method further comprises receiving a selection of the electrical device in the original appearance image to determine a position of the electrical device in the original appearance image as a predefined position of the electrical device, and determining a first characteristic image associated with the electrical device in a first state; and in response to a change in the state of the electrical device from the first state to a second state, obtaining a second original appearance image and determining a second characteristic image associated with the electrical device in the second state.

In some embodiments, the state of the electrical device has a digital characteristic, and wherein determining the state of the electrical device comprises: obtaining a predefined position and a characteristic image of the electrical device and a state corresponding to the characteristic image; searching, in the original appearance image, an area matching the characteristic image based on the predefined position; and determining the state of the electrical device based on the state corresponding to the characteristic image.

In some embodiments, the state of the electrical device has an analog characteristic, and wherein determining the state of the electrical device comprises: obtaining a predefined position and a plurality of characteristic images of the electrical device, and a plurality of states corresponding to the plurality of characteristic images respectively, wherein the plurality of states correspond to a plurality of values of the analog characteristic of the electrical device; searching, in the original appearance image, an area matching the plurality of characteristic images based on the predefined position; recognizing an indicator of the state of the analog characteristic in the area; and determining, based on the indicator of the state of the analog characteristic, the state of the electric device using a predefined relationship between a change in the state of the electrical device and the plurality of values.

In accordance with some embodiments, there is provided an apparatus for recognizing a state of an electrical device. The apparatus comprises an image capture device configured to obtain an image of the electrical device in a field, wherein the electrical device is disposed on a plane of a predefined polygon in the field; a processing device configured to: obtain an original appearance image of the electrical device in the field by recovering the predefined polygon in the image to an original appearance of the predefined polygon; and determine the state of the electrical device based on the original appearance image of the electrical device in the field.

In accordance with some embodiments, there is provided a device for recognizing a state of an electrical device. The device comprises a processing unit; and a memory coupled to the processing unit and including instructions stored thereon, the instructions, when executed by the processing unit, causing the device to perform acts comprising: receiving an image of the electrical device in a field, wherein the electrical device is disposed on a plane of a predefined polygon in the field; obtaining an original appearance image of the electrical device in the field by recovering the predefined polygon in the image to an original appearance of the predefined polygon; and determining the state of the electrical device based on the original appearance image of the electrical device in the field.

In accordance with some embodiments, there is provided a computer-readable storage medium having instructions stored thereon, the instructions, when executed by a computing device, cause the computing device to perform acts comprising: receiving an image of the electrical device in a field, wherein the electrical device is disposed on a plane of a predefined polygon in the field; obtaining an original appearance image of the electrical device in the field by recovering the predefined polygon in the image to an original appearance of the predefined polygon; and determining the state of the electrical device based on the original appearance image of the electrical device in the field.

The embodiments of the present disclosure can solve the problems that the speed of camera visual recognition is slow and the recognition is easily misjudged and the recognition performance is easily affected by changes in the field environment and camera position. In some embodiments, fast and stable camera visual recognition is achieved and the visual recognition digitalization of the state of electrical devices comes into a practical stage. These embodiments show a low computation cost of the camera image recognition and high recognition efficiency. In addition, in these embodiments, higher accuracy and reliability of recognition is implemented with stable performance of target recognition. Moreover, field computer learning for re-recognizing field objects or targets can be implemented and the identification content can be reconfigured without changing the source program. The method can be adapted to the models and layouts of various field devices, and to a variety of different lighting environments. Furthermore, these embodiments also describe a function of automatically adapting to changes in camera position and angle and thereby allow a great tolerance for camera position.

DETAILED DESCRIPTION OF EMBODIMENTS

Figure 1:
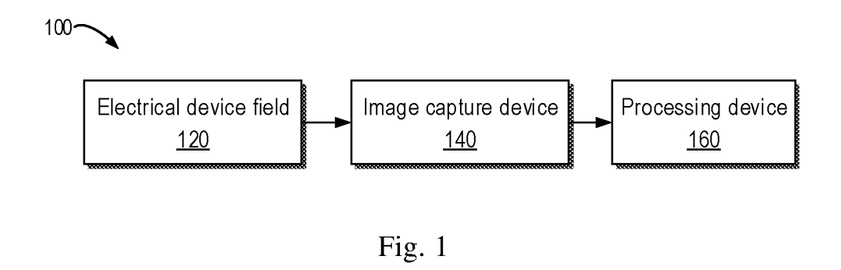
FIG. 1 illustrates a diagram of a system for identifying states of electrical devices according to an embodiment of the present disclosure.

FIG. 1 illustrates a diagram of a system 100 for identifying states of electrical device according to an embodiment of the present disclosure. As shown in FIG. 1, the system 100 includes an electrical device field 120, an image capture device 140, and a processing device 160. The electrical device field 120 is the environment in which the electrical device is located and the electrical device field 120 includes various electrical devices, including but not limited to: electrical devices or components such as circuit breakers, digital display meters, hand-type meters, indicator lights, buttons, and the like. Generally speaking, the installation positions of these electrical devices or components are fixed, that is, their positions cannot be easily changed once the installation is completed. Embodiments of the present disclosure can use this feature to facilitate recognition or identification of the states of one or more electrical devices.

The image capture device 140 may be a device for capturing images, such as a camera or a video camera. For convenience of description, the image capture device is sometimes simply referred to as a camera hereinafter. The system 100 or the processing device 160 is configured to recognize or identify objects in the image(s) obtained by the image capture device 140, for example, circuit breakers, digital display meters, hand-type meters, indicator lights, buttons, and so on. The processing device 160 may be, for example, a computer. Due to the difference in the position and shooting angle of the image capture device 140, the image formed by the field electrical device projected on the two-dimensional projection plane of the camera has certain geometric distortion. To identify the state of these electrical devices or components, some embodiments of the present disclosure arrange a reference object with a predefined polygonal shape at the electrical device field 120. For example, a rectangular frame can be placed at the electrical device field 120 and the electrical device can be placed on the plane where the rectangular frame is located. Preferably, the electrical device can be placed inside a rectangular frame.

Figure 2:
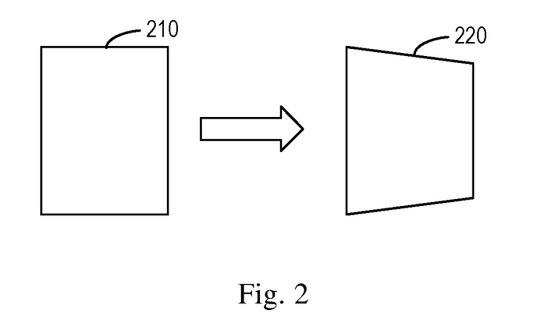
FIG. 2 illustrates a schematic diagram showing the distortion of a target in a camera image.

FIG. 2 illustrates a schematic diagram showing the distortion of a target in a camera image. The rectangle 210 may be a trapezoid 220 or other irregular quadrangle in the image captured by the camera. This geometric distortion can be described theoretically with a perspective transformation formula. Let the coordinates of a point be (u, v), and after imaging by the camera, its coordinates become (x, y). Considering the translation, scaling, rotation and point projection of the coordinate system, its coordinate transformation theoretically satisfies the following perspective transformation formula:

$$x = \frac{a_{11}u + a_{21}v + a_{31}}{a_{13}u + a_{23}v + a_{33}}$$
$$y = \frac{a_{12}u + a_{22}v + a_{32}}{a_{13}u + a_{23}v + a_{33}},$$

wherein the matrix $$[a_{ij}] = \begin{pmatrix} a_{11} & a_{12} & a_{13} \\ a_{21} & a_{22} & a_{23} \\ a_{31} & a_{y32} & a_{33} \end{pmatrix}$$

is perspective transformation matrix.

Figure 3:
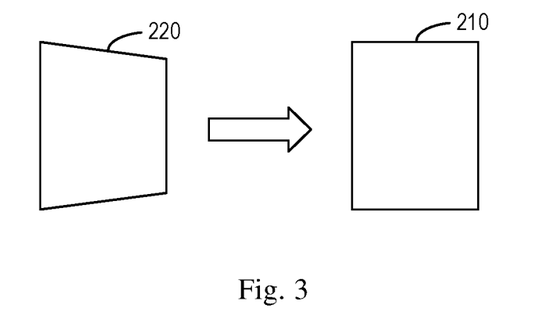
FIG. 3 illustrates a schematic diagram showing how to perform perspective correction on a distorted image.

If the perspective transformation matrix is known, we can calculate the coordinate position {(x1, y1), (x2, y2), ... (xn, yn)} of the object in the camera image from the geometric position coordinates {(u1, v1), (u2, v2), (un, vn)} of the object. On the other hand, the original appearance coordinate position of the object can also be calculated by means of inverse perspective transformation from the position of the object in the camera image. This method is called perspective correction. FIG. 3 shows a schematic diagram of how to perform perspective correction on a distorted image, in which the trapezoid 220 is corrected to a rectangle 210.

In some embodiments of the present disclosure, a known geometric polygon is disposed on the field to determine the perspective transformation matrix. Specifically, a geometric polygon with a known shape is placed on the field. For example, the polygon may be a known rectangle and an object to be identified may be set on a plane where the rectangle is located, for example, within a range of the known rectangle. The coordinates of the four vertices of the rectangle are known and set as $\{(u1, v1), (u2, v1), (u1, v2), (u2, v2)\}$. From the images taken by the camera, the coordinates $\{(x1, y1), (x2, y2), (x3, y3), (x4, y4)\}$ of these four vertices can be obtained. Therefore, the perspective transformation matrix [aij] can be calculated by the above perspective transformation formula. Since the target or object to be identified is on the plane of the known rectangle, each pixel of the camera image corresponding to the rectangle can be subjected to inverse perspective transformation so as to obtain the original appearance image of the identified target.

In actual applications, once the position of the camera changes, the processing device 160 detects that the position of the vertex of the known geometric polygon in the camera image changes. The system 100 recalculates the perspective transformation matrix of the above-mentioned method based on the new vertex position coordinates and then performs perspective correction on the camera image of the new perspective transformation matrix and thereby obtains an original appearance image of the identified target. This process can also be called perspective correction adjustment mode. As this process can be real-time and dynamic, the system can always obtain the original appearance image of the identified target. With this process, subsequent image identification can be ensured in a reliable manner.

Figure 4:
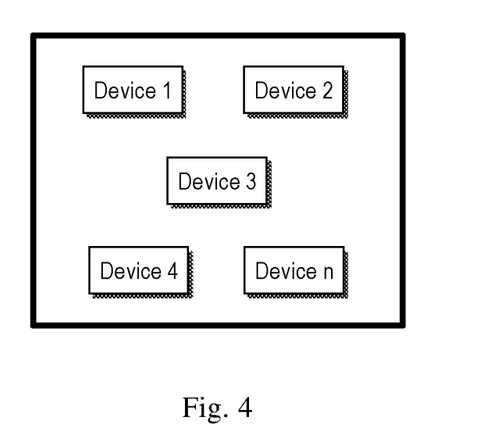
FIG. 4 illustrates a schematic diagram of a visual rectangle according to an embodiment of the present disclosure.

FIG. 4 illustrates a schematic diagram of a visual rectangle according to an embodiment of the present disclosure. As shown in FIG. 4, a visual rectangular frame can be placed on the edge of the electrical device cabinet, which is convenient for the computer to identify and track the rectangular frame. For example, visual characteristics can be indicated by particular colors.

Figure 5:
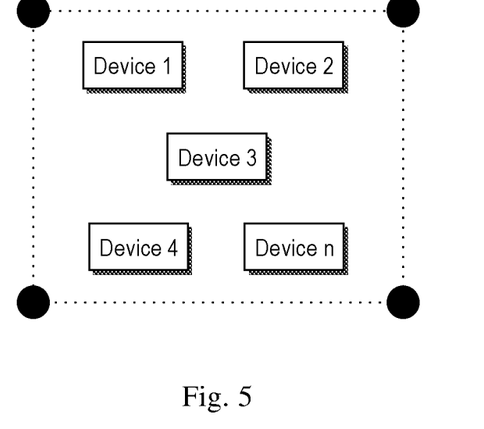
FIG. 5 illustrates a schematic diagram of a visual rectangle according to another embodiment of the present disclosure.

FIG. 5 illustrates a schematic diagram of a visual rectangle according to another embodiment of the present disclosure. As shown in FIG. 5, four visual labels can be placed on the edge of the electrical device cabinet so that the four visual labels form vertices of a rectangle. For example, visual characteristics can be indicated by particular colors.

It is relatively convenient to define the location of the electrical device in order to identify the state of the electrical device by arranging the electrical device inside the visual rectangle. Although FIGS. 4 and 5 show two embodiments in which a visual rectangle is provided at the edge of an electrical device cabinet, the predefined polygon may also be provided at other location of the electrical device cabinet or in another environment as long as the electrical device is disposed in the plane of the predefined polygon.

In general, after obtaining the corrected field device original appearance image, the field computer learning method can be used to quickly identify the state of the electrical device. In the field computer learning method, an object recognition configuration database is constructed in advance before the system starts image recognition. For example, in the corrected field device original appearance image, image areas containing the state characteristics of the electrical devices are selected one by one by the human-machine operation, and the position information of these areas and all the characteristic images reflecting the change in the state of electrical devices are saved to form the object recognition configuration database.

Because the installation position of the field devices is fixed, when the system performs recognition, the system reads the object recognition configuration database, searches and matches the specified electrical device characteristic image based on the image position specified by the database and determines the digital characteristics of the electrical device based on the matching result (such as on, off, open, close, etc.).

If the electrical device has an analog characteristic (such as a hand-type meter), the analog value of the electrical device is obtained by the image analysis algorithm within this local range based on the analog position image information predefined by the object recognition configuration database (for example, image information corresponding to the maximum and minimum values of the analog characteristic). In the recognition process, since the system does not have to scan and judge the entire image range and it only performs recognition and analysis on the specified area, rapid judgment can be achieved. As the characteristic images of the states of each device are individually defined, the selectivity for the object recognition is very high and the false positive rate is extremely low.

Figure 6:
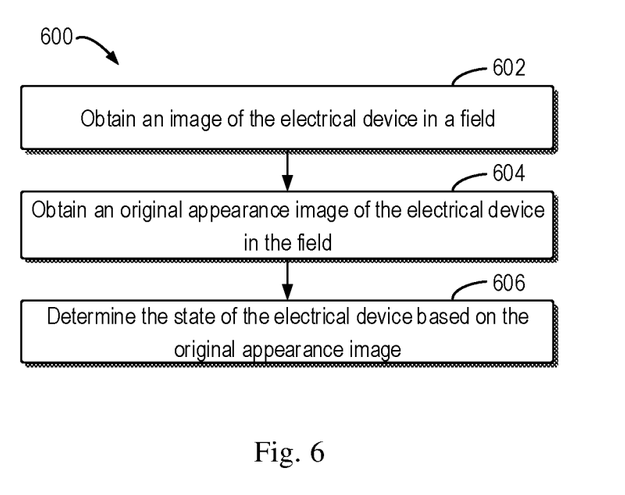
FIG. 6 illustrates a flowchart of a method for identifying states of electrical devices according to an embodiment of the present disclosure.

FIG. 6 illustrates a flowchart of a method 600 for identifying states of electrical devices according to an embodiment of the present disclosure. FIG. 6 may be implemented by the system 100 shown in FIG. 1 and specifically, may be implemented by the image capture device 140 and the processing device 160 in the system 100.

At 602, the image capture device 140 obtains an image of an environment in which the electrical device is located, where the electrical device is disposed on a plane of a predefined polygon in the environment. This environment may also be referred to as an electrical device field or field environment, for example, the electrical device field 120 as shown in FIG. 1. In some embodiments, the predefined polygon is a rectangle and the coordinates of the vertices of the rectangle are known. In some embodiments, the environment includes a visual frame having a polygonal shape, for example, as shown in FIG. 4. In some embodiments, the environment includes visual labels disposed at vertices of the polygon, for example, as shown in FIG. 5.

At 604, the processing device 160 obtains an original appearance image of the electrical device in the environment by restoring the predefined polygon in the image to the original appearance of the predefined polygon. Specifically, the original appearance image can be obtained by performing the perspective correction method as described in FIGS. 2 and 3.

At 606, the processing device 160 determines the state of the electrical device based on the original appearance image of the field. This can be achieved by field computer learning. In some embodiments, the method 600 further includes receiving a selection of the electrical device in the original appearance image to determine a position of the electrical device in the original appearance image and to use the position as a predefined position of the electrical device. In addition, a first characteristic image associated with the electrical device in a first state may be determined. This characteristic image may be a part of the original appearance image at the predefined location of the electrical device.

When the state of the electrical device is changed from the first state to the second state, a second original appearance image may be obtained, and a second characteristic image associated with the electrical device in a second state may be determined. The state change can be achieved by automatic control or manual operation and the disclosure is not limited in this regard herein. For example, for a switch, the first state may be an on state and the second state is an off state. In this case, corresponding characteristic images are obtained for the on and off states, respectively.

In some embodiments, the state of the electrical device has an analog characteristic, and the first state and the second state correspond to a first value and a second value of the analog characteristic of the electrical device. The change in the state of the electrical device has a predefined relationship with the first value and the second value. For example, for a hand-type analog quantity, the first value and the second value may be the maximum and minimum values of the analog quantity. In this case, the change in the analog characteristic can have a predefined linear or exponential relationship with the two values. In addition, in the temperature measurement of the electrical device, different colors can be used to indicate different temperatures. In this case, the first value and the second value may correspond to two different colors or temperatures. Accordingly, the change in color or temperature may have a predefined relationship with the two values and the relationship may be presented in the form of a table, for example.

The method steps of the field learning mode of the method 300 are described above. Generally speaking, the learning mode is the basis of the normal working mode. In the following, several embodiments of the normal working mode will be introduced in combination with analog quantity and digital quantity respectively.

In some embodiments, the state of the electrical device has digital quantity characteristics. Determining the state of the electrical device comprises obtaining a predefined position and a characteristic image of the electrical device and a state corresponding to the characteristic image; searching an area matching the characteristic image based on the predefined position within the original appearance image; and determining the state of the electrical device based on the state corresponding to the characteristic image. In particular, a region matching a characteristic image may be searched within a certain range around a predefined position. In this way, the state of the electrical device can be determined without processing the entire image and only parts of image portion most relevant to the electrical device is processed. As a result, computing resources is saved and computing efficiency is improved.

In some embodiments, the state of the electrical device has analog quantity characteristics. Determining the state of the electrical device comprise obtaining a predefined position of the electrical device, a plurality of characteristic images, and a plurality of states corresponding to the plurality of characteristic images, respectively, the plurality of states correspond to a plurality of values of analog quantity characteristics of the electrical device; searching an area matching the plurality of characteristic images based on the predefined position within the original appearance image; recognizing an indicator of the state of the analog quantity characteristics in the area; and based on the indicator of the state of the analog quantity characteristics, determining the state of the electrical device by the predefined relationship between the change in the state of the electrical device and the plurality of values. As mentioned above, for some applications, the plurality of states may correspond to the maximum and minimum values of the analog quantity. For the sake of clarity, details will not be repeated them here.

Figure 7:
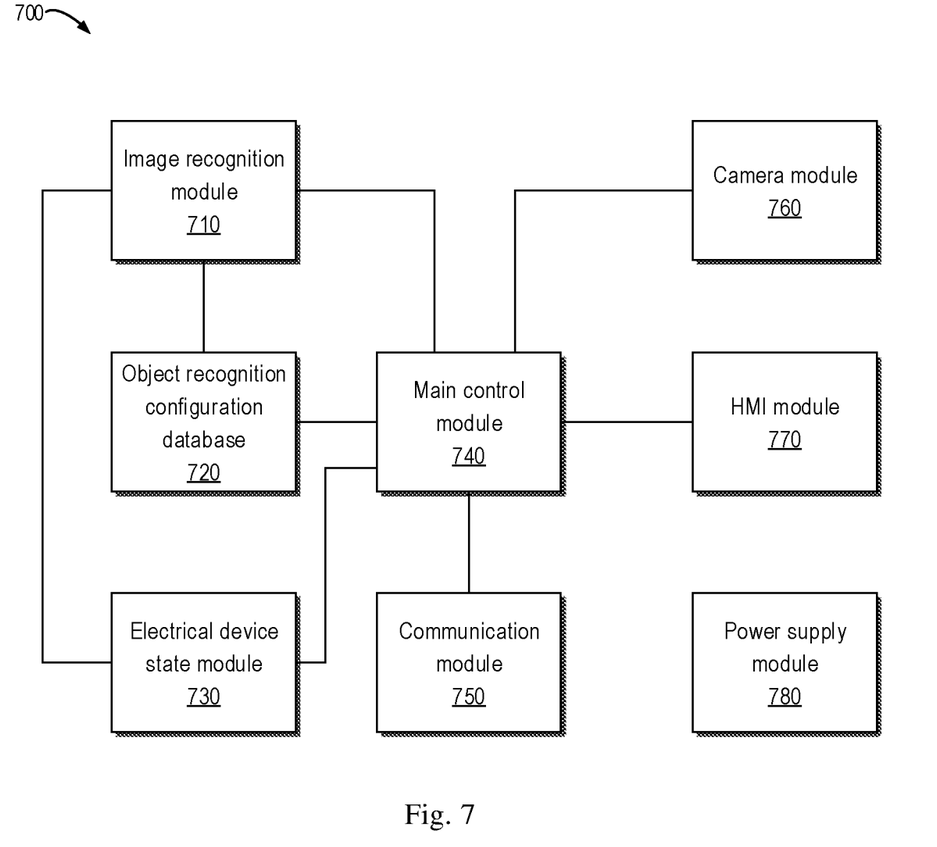
FIG. 7 illustrates a diagram of an apparatus for identifying states of electrical devices according to an embodiment of the present disclosure.

FIG. 7 illustrates a diagram of an apparatus 700 for identifying states of electrical devices according to one embodiment of the present disclosure. As shown in FIG. 7, the device 700 includes a camera module 760, a main control module 740, an image recognition module 710, an object recognition configuration database 720, a human-machine interface (HMI) module 770, an electrical device state module 730, a communication module 750 and a power supply module 780. It should be understood that the division of the above functional modules is only for the convenience of explaining the image recognition method and principle. In some embodiments, multiple modules can be combined into one module, a module can be further split into multiple modules and/or one or more of the modules can also be omitted.

The camera module 760 may obtain an image of the electrical device on field and transmit the image data to the main control module 740. The main control module 740 transmits the image obtained by the camera module 760 to the image recognition module 710 for image recognition. The image recognition module 710 receives the image data transmitted from the main control module 740 and performs image correction and recognition in combination with the predefined information of the object recognition configuration database 720 and transmits the digital recognition result to the electrical device state module 730. The electrical device state module 730 saves the state information of the field electrical device, and in some embodiments, the state information of the electrical device is stored digitally for easy management and transmission. The information in the object recognition configuration database 740 is obtained by a user using the human-machine interface module 770 to perform field computer learning on the target image that needs to be recognized. The main control module 740 reads the data in the electrical device state module 730 and processes the read data. The communication module 750 sends the state information of the electrical device to a remote server to implement digital and networked information sharing and decision analysis. The power supply module 780 may provide power to the modules in the apparatus 700.

Figure 8:
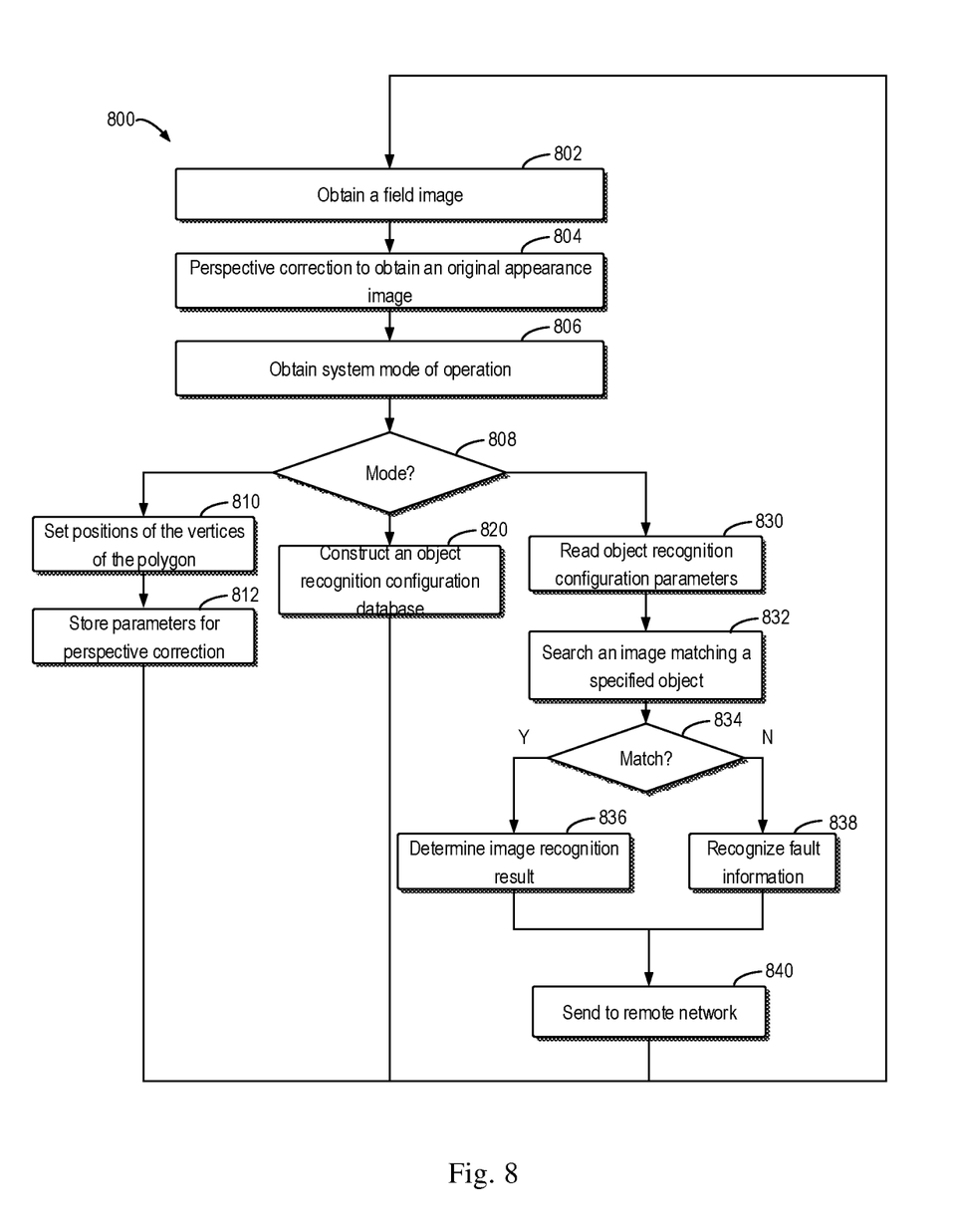
FIG. 8 illustrates a flowchart of a method for identifying states of electrical devices according to an embodiment of the present disclosure.

The principle of the device 700 shown in FIG. 7 is described in further detail below with reference to FIG. 8, which illustrates a flowchart of a method 800 for identifying states of electrical devices according to an embodiment of the present disclosure.

At 802, the main control module 740 obtains an image of the electrical device field from the camera module 760. The electrical device field includes one or more electrical device or components and is provided with a polygon having a predefined shape.

At 804, the main control module 740 identifies the coordinates of the vertices of the polygon in the image and performs perspective correction on the image to obtain the original appearance image of the field device. In particular, the original appearance image can be obtained using the perspective correction method described in FIGS. 2 and 3.

At 806, the main control module 740 obtains the current working mode of the system from the human-machine interface module 770, wherein the working modes may include: a perspective correction adjustment mode, a field computer learning mode, a normal working mode, and the like.

If the perspective correction adjustment mode is determined at 806, the coordinate definition of the vertices of the polygon is obtained through the human-machine interface module 770 at 810 and the perspective correction is started and the perspective correction parameters (for example, the perspective transformation matrix as described above) are saved in the object recognition configuration database 720 at 812. The system can then enter the next loop and return to 702.

If the field computer learning mode is determined at 806, then at 820, the position and area of the characteristic image of the electrical device are selected from the original appearance image of the field device through the human-machine interface module, and the relationship between each device state and the characteristic image is defined to establish the object recognition configuration database 720. For example, if the electrical device is a switch with two states of on and off, the original appearance image of the field is obtained for the two states respectively. The area of the characteristic image corresponding to the switch and the state corresponding to the characteristic image are determined respectively. The corresponding areas and states are also called the object recognition parameter. In this manner, the object recognition configuration database 720 is established. The system can then enter the next loop and return to 702.

For electrical device with analog quantity characteristics, the original appearance images of the field for the limit states within a predefined range can be obtained and corresponding analog quantity values can be defined. For example, for the meter hand, the original appearance image of the field can be obtained for the start position and the end position in the meter hand and the corresponding analog quantity values are defined for the two images.

If it is determined to be the normal operating mode at 808, then at 830, the image recognition module 710 reads the object recognition parameters in the object recognition configuration database 720. At 832, an image matching the specified object may be searched in the original appearance image of the area specified by the object recognition parameter. As mentioned above, the device field is usually kept fixed, so you can search in the specified area instead of searching the entire image, As a result, higher accuracy is achieved and calculations are saved.

If it is determined at 834 that the image matching is successful, then at 836 the state information of the electrical device is determined. For an electrical device (e.g., a switch) with digital quantity characteristics, since the matched image in the object recognition configuration database 720 has the corresponding state, the state of the electrical device can be directly determined. For electrical device with analog quantity characteristics, the analog quantity value of the device is obtained based on the characteristic images of the limit states of the analog quantity defined in the object recognition configuration database 720 by an image analysis algorithm. For example, for a meter hand, the position of an indicator indicating analog quantity characteristics may be identified in a matching area. Then the state of the electrical device may be determined based on the position of the indicator and the characteristic images of the limit states of the analog quantity defined in the database. In addition, the image recognition module 710 may update the information in the electrical device state module 730 based on the recognition result.

If it is determined at 834 that the image matching is not successful, the error information is saved in the electrical device state module 730. The main control module 740 may send the information in the electrical device state module 730 to the remote network through the communication module 760 at 840. The system can then enter the next loop and return to 702.

In these embodiments, the computation amount of the camera image recognition process is reduced and the recognition efficiency is high. In addition, the performance of object recognition is stable with higher accuracy and reliability. It is convenient for users to perform field computer learning on targets or objects and reconfigure the recognition content without changing the source program. Therefore, the method can be adapted to the models and layouts of various devices on field and to various different lighting environments. The method has the function of automatically adapting to camera positions and changes in angle and has a large tolerance for changes in camera positions.

The method, device, and system for identifying the state of electrical devices of some embodiments of the present disclosure are described above in conjunction with FIGS. 1 to 8. It should be understood that the functions described above herein may be performed, at least in part, by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

Computer program code for implementing the methods of the present disclosure may be written in one or more programming languages. These computer program codes may be provided to a processor of a general-purpose computer, special purpose computer, or other programmable data processing device so that the program code, when executed by the computer or other programmable data processing device, causes the functions/operations specified in a flowchart and/or block diagram are implemented. The program code can be executed entirely on a computer, partly on a computer, as a stand-alone software package, partly on a computer and partly on a remote computer or entirely on a remote computer or server.

In the context of the present disclosure, a machine-readable medium may be any tangible medium that contains or stores a program for or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination thereof. More detailed examples of machine-readable storage media include electrical connections with one or more wires, portable computer disks, hard disks, random access memory (RAM), read-only memory (ROM), erasable programmable read-only Memory (EPROM or flash memory), optical storage device, magnetic storage device, or any suitable combination thereof.

In addition, although operations are depicted in a particular order, this should not be construed as requiring that such operations be performed in the particular order shown or in a sequential order, or that all illustrated operations be performed to obtain a desired result. In some cases, multitasking or parallel processing can be beneficial. Likewise, although the above discussion includes certain specific implementation details, this should not be construed as limiting the scope of any invention or claim, but rather as a description of a particular embodiment that can be directed to a particular invention. Certain features that are described in this specification in the context of separate embodiments can also be implemented in combination in a single embodiment. Conversely, various features that are described in the context of a single embodiment can also be implemented separately in multiple embodiments or in any suitable sub combination.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

We claim:

1. A method of recognizing a state of an electrical device, comprising:
   obtaining an image of the electrical device in a field, wherein the electrical device is disposed on a plane of a predefined polygon in the field;
   obtaining an original appearance image of the electrical device in the field by recovering the predefined polygon in the image to an original appearance of the predefined polygon; and
   determining the state of the electrical device by comparing the original appearance image of the electrical device in the field to a predetermined original appearance image of the electrical device corresponding to a predetermined state of the electrical device,
   wherein obtaining the original appearance image of the electrical device comprises:
      determining coordinates of vertices of the predefined polygon in the image;
      determining a perspective transformation matrix based on coordinates of the vertices of the predefined polygon in the field and the determined coordinates of the vertices of the predefined polygon in the image; and
      obtaining the original appearance image of the electrical device in the field based on the perspective transformation matrix,
   wherein the state of the electrical device has an analog characteristic, and wherein determining the state of the electrical device comprises:
      obtaining a predefined position and a plurality of characteristic images of the electrical device, and a plurality of states corresponding to the plurality of characteristic images respectively, wherein the plurality of states correspond to a plurality of values of the analog characteristic of the electrical device;
      searching the original appearance image based on the predefined position to determine an area matching the plurality of characteristic images;
      in response to determining the area matching the plurality of characteristic images:
         recognizing an indicator of the state of the analog characteristic in the area; and
         determining, based on the indicator of the state of the analog characteristic, the state of the electric device using a predefined relationship between a change in the state of the electrical device and the plurality of values; and
      in response to failing to determine the area matching the plurality of characteristic images, generating error information indicating that image matching is not successful.

2. The method of claim 1, wherein the predefined polygon is a rectangle comprising vertices with known coordinates.

3. The method of claim 1, wherein the field comprises at least one of:
   a visual frame having a shape of the predefined polygon; and
   visual labels at vertices of the predefined polygon.

4. The method of claim 1, wherein the electrical device is disposed inside the predefined polygon.

5. The method of claim 1, further comprising:
   receiving a selection of the electrical device in the original appearance image to determine a position of the electrical device in the original appearance image as the predefined position of the electrical device, and determining a first characteristic image associated with the electrical device in a first state; and in response to a change in the state of the electrical device from the first state to a second state, obtaining a second original appearance image and determining a second characteristic image associated with the electrical device in the second state.

6. The method of claim 5, wherein the state of the electrical device has the analog characteristic, and the first and second states correspond to first and second values of the analog characteristic of the electrical device, and the change in the state of the electrical device has a predefined relationship with the first and second values.

7. An apparatus for recognizing a state of an electrical device, comprising:
   an image capture device configured to obtain an image of the electrical device in a field, wherein the electrical device is disposed on a plane of a predefined polygon in the field;
   a processing device configured to:
      obtain an original appearance image of the electrical device in the field by recovering the predefined polygon in the image to an original appearance of the predefined polygon; and
      determine the state of the electrical device by comparing the original appearance image of the electrical device in the field to a predetermined original appearance image of the electrical device corresponding to a predetermined state of the electrical device,
      wherein the processing device is configured to obtain the original appearance image of the electrical device by:
         determining coordinates of vertices of the predefined polygon in the image;
         determining a perspective transformation matrix based on coordinates of the vertices of the predefined polygon in the field and the determined coordinates of the vertices of the predefined polygon in the image; and
         obtaining the original appearance image of the electrical device in the field based on the perspective transformation matrix,
      wherein the state of the electrical device has an analog characteristic, and wherein determining the state of the electrical device comprises:
         obtaining a predefined position and a plurality of characteristic images of the electrical device, and a plurality of states corresponding to the plurality of characteristic images respectively, wherein the plurality of states correspond to a plurality of values of the analog characteristic of the electrical device;
         searching the original appearance image based on the predefined position to determine an area matching the plurality of characteristic images;
         in response to determining the area matching the plurality of characteristic images:
            recognizing an indicator of the state of the analog characteristic in the area; and
            determining, based on the indicator of the state of the analog characteristic, the state of the electric device using a predefined relationship between a change in the state of the electrical device and the plurality of values; and in response to failing to determine the area matching the plurality of characteristic images, generating error information indicating that image matching is not successful.

8. The apparatus of claim 7, wherein the predefined polygon is a rectangle comprising vertices with known coordinates.

9. The apparatus of claim 7, wherein the field comprises at least one of:
a visual frame having a shape of the predefined polygon; and
visual labels at vertices of the predefined polygon.

10. The apparatus of claim 7, wherein the electrical device is disposed inside the predefined polygon.

11. The apparatus of claim 7, wherein the processing device is further configured to:
receive a selection of the electrical device in the original appearance image to determine a position of the electrical device in the original appearance image as the predefined position of the electrical device, and determining a first characteristic image associated with the electrical device in a first state; and
in response to a change in the state of the electrical device from the first state to a second state, obtain a second original appearance image and determining a second characteristic image associated with the electrical device in the second state.

12. The apparatus of claim 11, wherein the state of the electrical device has the analog characteristic, and the first and second states correspond to first and second values of the analog characteristic of the electrical device, and the change in the state of the electrical device has a predefined relationship with the first and second values.

13. A device for recognizing a state of an electrical device, comprising:
a processing unit; and
a memory coupled to the processing unit and including instructions stored thereon, the instructions, when executed by the processing unit, causing the device to perform acts comprising:
receiving an image of the electrical device in a field, wherein the electrical device is disposed on a plane of a predefined polygon in the field;
obtaining an original appearance image of the electrical device in the field by recovering the predefined polygon in the image to an original appearance of the predefined polygon; and
determining the state of the electrical device by comparing the original appearance image of the electrical device in the field to a predetermined original appearance image of the electrical device corresponding to a predetermined state of the electrical device,
wherein obtaining the original appearance image of the electrical device comprises:
determining coordinates of vertices of the predefined polygon in the image;
determining a perspective transformation matrix based on coordinates of the vertices of the predefined polygon in the field and the determined coordinates of the vertices of the predefined polygon in the image; and
obtaining the original appearance image of the electrical device in the field based on the perspective transformation matrix,
wherein the state of the electrical device has an analog characteristic, and wherein determining the state of the electrical device comprises:
obtaining a predefined position and a plurality of characteristic images of the electrical device, and a plurality of states corresponding to the plurality of characteristic images respectively, wherein the plurality of states correspond to a plurality of values of the analog characteristic of the electrical device;
searching the original appearance image based on the predefined position to determine an area matching the plurality of characteristic images;
in response to determining the area matching the plurality of characteristic images:
recognizing an indicator of the state of the analog characteristic in the area; and
determining, based on the indicator of the state of the analog characteristic, the state of the electric device using a predefined relationship between a change in the state of the electrical device and the plurality of values; and
in response to failing to determine the area matching the plurality of characteristic images, generating error information indicating that image matching is not successful.

14. The device of claim 13, wherein the acts further comprise:
receiving a selection of the electrical device in the original appearance image to determine a position of the electrical device in the original appearance image as the predefined position of the electrical device, and determining a first characteristic image associated with the electrical device in a first state; and
in response to a change in the state of the electrical device from the first state to a second state, obtaining a second original appearance image and determining a second characteristic image associated with the electrical device in the second state.

15. A non-transitory computer-readable storage medium having instructions stored thereon, the instructions, when executed by a computing device, cause the computing device to perform acts comprising:
receiving an image of the electrical device in a field, wherein the electrical device is disposed on a plane of a predefined polygon in the field;
obtaining an original appearance image of the electrical device in the field by recovering the predefined polygon in the image to an original appearance of the predefined polygon; and
determining the state of the electrical device by comparing the original appearance image of the electrical device in the field to a predetermined original appearance image of the electrical device corresponding to a predetermined state of the electrical device,
wherein obtaining the original appearance image of the electrical device comprises:
determining coordinates of vertices of the predefined polygon in the image;
determining a perspective transformation matrix based on coordinates of the vertices of the predefined polygon in the field and the determined coordinates of the vertices of the predefined polygon in the image; and obtaining the original appearance image of the electrical device in the field based on the perspective transformation matrix, wherein the state of the electrical device has an analog characteristic, and wherein determining the state of the electrical device comprises:

obtaining a predefined position and a plurality of characteristic images of the electrical device, and a plurality of states corresponding to the plurality of characteristic images respectively, wherein the plurality of states correspond to a plurality of values of the analog characteristic of the electrical device;

searching the original appearance image based on the predefined position to determine an area matching the plurality of characteristic images;

in response to determining the area matching the plurality of characteristic images:
recognizing an indicator of the state of the analog characteristic in the area; and
determining, based on the indicator of the state of the analog characteristic, the state of the electric device using a predefined relationship between a change in the state of the electrical device and the plurality of values; and in response to failing to determine the area matching the plurality of characteristic images, generating error information indicating that image matching is not successful.

16. The non-transitory computer-readable storage medium of claim 15, wherein the acts further comprise:

receiving a selection of the electrical device in the original appearance image to determine a position of the electrical device in the original appearance image as the predefined position of the electrical device, and determining a first characteristic image associated with the electrical device in a first state; and in response to a change in the state of the electrical device from the first state to a second state, obtaining a second original appearance image and determining a second characteristic image associated with the electrical device in the second state.

* * * * *